US011848969B2

(12) United States Patent
Hu

(10) Patent No.: US 11,848,969 B2
(45) Date of Patent: Dec. 19, 2023

(54) VIDEO AND AUDIO DATA PROCESSING METHOD AND APPARATUS, COMPUTER-READABLE STORAGE MEDIUM, AND ELECTRONIC APPARATUS

(71) Applicant: Tencent Technology (Shenzhen) Company Limited, Shenzhen (CN)

(72) Inventor: Rencheng Hu, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 113 days.

(21) Appl. No.: 17/462,744

(22) Filed: Aug. 31, 2021

(65) Prior Publication Data
US 2021/0400092 A1   Dec. 23, 2021

Related U.S. Application Data

(63) Continuation of application No. PCT/CN2020/097510, filed on Jun. 22, 2020.

(30) Foreign Application Priority Data

Jun. 25, 2019 (CN) .......................... 201910556295.3

(51) Int. Cl.
*H04L 65/403* (2022.01)
(52) U.S. Cl.
CPC .................. *H04L 65/403* (2013.01)
(58) Field of Classification Search
CPC . H04L 65/403; H04L 65/752; H04L 65/1089; H04L 65/80; H04L 65/762
USPC .......................... 348/14.01–14.16
See application file for complete search history.

(56) References Cited

U.S. PATENT DOCUMENTS

| 8,527,649 | B2 | 9/2013 | Wexler et al. |
| 9,148,379 | B1 | 9/2015 | Murashenkov et al. |
| 9,538,128 | B2 | 1/2017 | Chou |
| 2003/0067872 | A1 | 4/2003 | Harrell et al. |

(Continued)

FOREIGN PATENT DOCUMENTS

| CN | 1402143 A |   | 3/2003 |
| CN | 1492143 A | * | 4/2004 |

(Continued)

OTHER PUBLICATIONS

International Search Report and Written Opinion with English Translation for International Patent Application No. PCT/CN2020/097510 dated Sep. 25, 2020; 12 pages.

(Continued)

*Primary Examiner* — Melur Ramakrishnaiah
(74) *Attorney, Agent, or Firm* — Crowell & Moring LLP

(57) ABSTRACT

This application provides a data processing method and apparatus, a non-transitory computer-readable storage medium, and an electronic apparatus. The method includes the following steps: A server obtains stream control signaling transmitted by an interface machine, the interface machine being configured to obtain, from the server, audio and video data to be transmitted to a client. The server obtains, in response to the stream control signaling, a first transmission rate from the server to the interface machine. The server transmits audio data to the interface machine if the first rate is less than a first predetermined threshold, and discards video data in the same GOP as the audio data.

20 Claims, 8 Drawing Sheets

(56) References Cited

U.S. PATENT DOCUMENTS

| | | | |
|---|---|---|---|
| 2011/0225315 A1 | 9/2011 | Wexler et al. | |
| 2015/0373302 A1* | 12/2015 | Hui | H04L 47/2416 |
| | | | 348/14.12 |
| 2017/0041355 A1* | 2/2017 | Ramamurthy | H04L 65/612 |
| 2018/0309960 A1 | 10/2018 | Abkairov et al. | |

FOREIGN PATENT DOCUMENTS

| | | | |
|---|---|---|---|
| CN | 102790913 A | 11/2012 | |
| CN | 104394484 A | 3/2015 | |
| CN | 105656910 A | 6/2016 | |
| CN | 105659541 A | 6/2016 | |
| CN | 106713947 A | 5/2017 | |
| CN | 110248256 A | 9/2019 | |

OTHER PUBLICATIONS

Office Action with English Translation of Concise Explanation of Relevance for Chinese Patent Application No. 201910556295.3 dated Mar. 2, 2021; 11 pages.

Extended European Search Report for European Patent Application No. 20833636.2 dated Jun. 24, 2022, 9 pages.

\* cited by examiner

VIDEO AND AUDIO DATA PROCESSING METHOD AND APPARATUS, COMPUTER-READABLE STORAGE MEDIUM, AND ELECTRONIC APPARATUS

RELATED APPLICATION

This application is a continuation application of the International PCT Application No. PCT/CN2020/097510, filed with the China National Intellectual Property Administration, PRC on Jun. 22, 2020 which claims priority to Chinese Patent Application No. 201910556295.3, filed with the China National Intellectual Property Administration, PRC on Jun. 25, 2019, each of which is incorporated herein by reference in their entireties.

FIELD OF THE TECHNOLOGY

This application relates to the field of computers, and specifically, to a data processing method and apparatus, a computer-readable storage medium, and an electronic apparatus.

BACKGROUND OF THE DISCLOSURE

In an audio and video data transmission scenario, direct connect (DC) traffic based on a border gateway protocol (BGP) network is widely used. In addition, a user datagram protocol (UDP) based on a private solution is used as a medium for data transmission. However, BGP bandwidth is expensive, which means that a client needs to bear relatively high costs. In addition, a customized private protocol is used for an application layer, software development kits (SDKs) are diversified, and stickiness of a user to a merchant is quite high. There is also a great difficulty in problem analysis.

Based on the above, a real time messaging protocol (RTMP) based solution is developed for audio and video data transmission. In the solution, expensive BGP bandwidth is replaced with cheaper edge bandwidth, and the original private UDP is replaced with a standard RTMP, so as to reduce the difficulty in client access and the overall costs.

SUMMARY

Embodiments of this application provide a data processing method, performed by a server, the data processing method including: obtaining stream control signaling transmitted by an interface machine, the interface machine being configured to obtain, from the server, audio and video data to be transmitted to a client; obtaining, in response to the stream control signaling, a first rate at which the server transmits the audio and video data to the interface machine; and transmitting audio data to the interface machine if the first rate is less than a first predetermined threshold, and discarding video data in the same GOP as the audio data.

The embodiments of this disclosure provide a data processing apparatus, including: a first obtaining module, configured to obtain stream control signaling transmitted by an interface machine, the interface machine being configured to obtain, from the server, audio and video data to be transmitted to a client; a second obtaining module, configured to obtain, in response to the stream control signaling, a first rate at which the server transmits the audio and video data to the interface machine; and a first processing module, configured to: transmit audio data to the interface machine if the first rate is less than a first predetermined threshold, and discard video data in the same GOP as the audio data.

An embodiment of this disclosure provides a non-transitory computer-readable storage medium. The non-transitory computer-readable storage medium stores a computer program, the computer program, when executed, implementing the data processing method provided by the embodiments of this disclosure.

An embodiment of this disclosure provides an electronic apparatus, including a memory and a processor, the memory storing a computer program, the processor being configured to, when executing the computer program, implement the data processing method provided by the embodiments of this disclosure.

BRIEF DESCRIPTION OF THE DRAWINGS

The accompanying drawings illustrated herein are used for providing further understanding of embodiments of this disclosure and constitute a part of the embodiments of this disclosure, but do not constitute an inappropriate limit on the embodiments of this disclosure. In the accompanying drawings.

DESCRIPTION OF EMBODIMENTS

Figure 1:
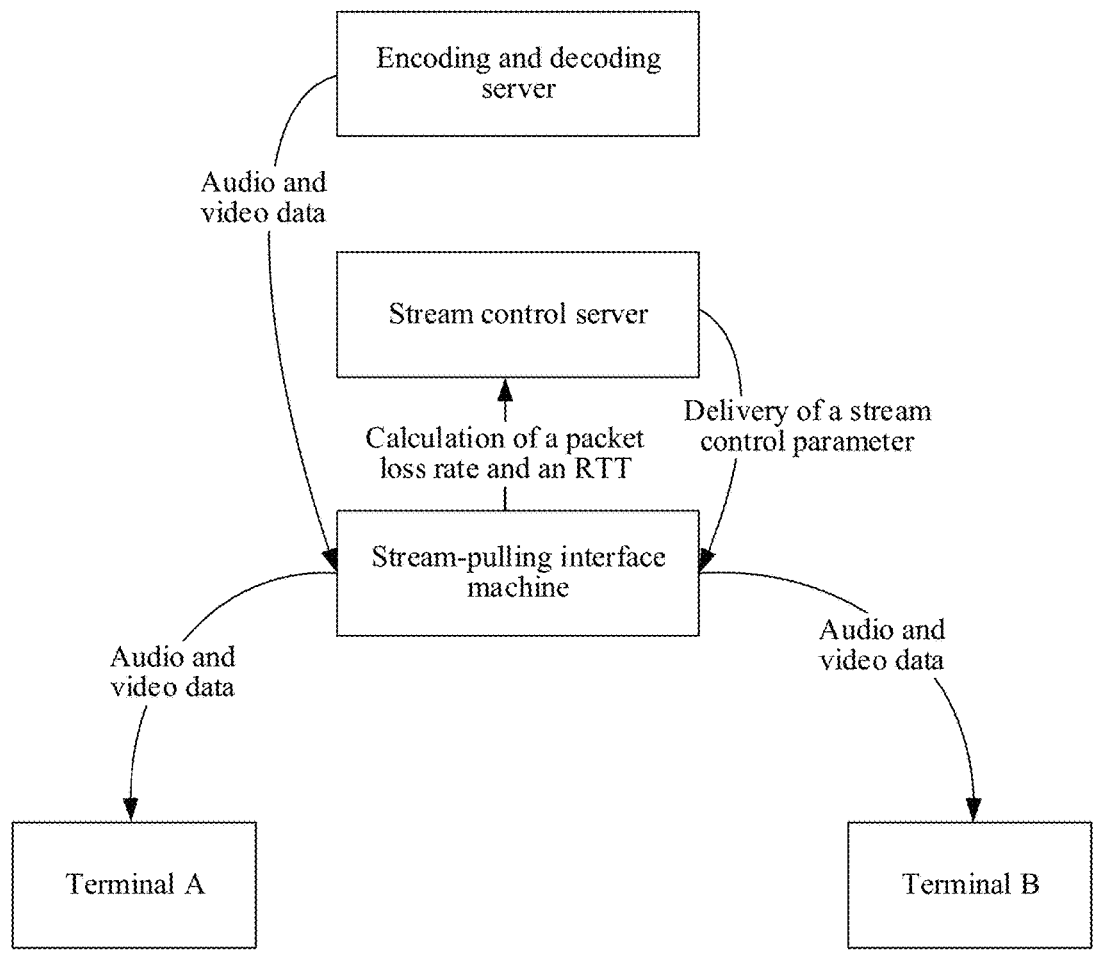
FIG. 1 is a schematic structural diagram of a video call in interactive live streaming in the related art.

In order to make a person skilled in the art better understand the solutions of this application, the following clearly and completely describes the technical solutions in the embodiments of this disclosure with reference to the accompanying drawings in the embodiments of this disclosure. Apparently, the described embodiments are only some of the embodiments of this disclosure rather than all of the embodiments. All other embodiments obtained by a person of ordinary skill in the art based on the embodiments of this disclosure without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict. In addition, in the following description, "a plurality of" means at least two.

Unless otherwise defined, meanings of all technical and scientific terms used in this specification are the same as those usually understood by a person skilled in the art to which this application belongs. Terms used in this specification are merely intended to describe objectives of the embodiments of this disclosure, but are not intended to limit this application.

In this specification, claims, and the foregoing accompanying drawings of this application, the terms "first", "second", and so on are intended to distinguish between similar objects but do not necessarily indicate a specific order or sequence. It is to be understood that the data termed in such a way are interchangeable in proper circumstances, so that the embodiments of this disclosure described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

First, terms used in the embodiments of this disclosure are described.

1. Video frames mainly include three types as follows. A key frame (I frame), also referred to as an intra-coded frame, can be directly decoded without reference to other frames to obtain a video image, and has large frame data. A forward prediction coded frame (P frame) is a frame that needs to be decoded with reference to a previous frame, and an image cannot be restored only with the frame data of the P frame. The P frame generally has small frame data. A bidirectionally interpolated prediction frame (B frame) needs to be decoded with reference to a previous frame and a next frame, and an image cannot be restored only with the frame data of the B frame. The B frame generally has small frame data. In this disclosure, video data may generally include multiple video frames which may belong to same or different video frame type.

2. A group of pictures (GOP) is a group of video frame data in a video stream. The GOP may begin with an I frame, followed by several P frames and B frames, and ends before a next I frame. The next I frame may belong to another GOP.

3. An RTMP is an application layer protocol used for resolving problems of multiplexing and packetization of a multimedia data transmission stream.

In an audio and video data transmission scenario, for example, a one-to-one, one-to-many, or many-to-many audio and video call scenario, DC traffic based on a BGP network is mostly used. In addition, UDP based on a private solution is used as a medium for data transmission. A video call is the transmission of audio and video data (i.e., combined data for audio data and video data) between a plurality of clients, and a server usually needs to be used as a medium for data transmission. However, BGP bandwidth is expensive, which means that a client needs to bear relatively high costs, and the BGP bandwidth cannot be adopted in many low-cost scenarios. In addition, a customized private protocol is used for an application layer, SDKs are diversified, and stickiness of a user to a merchant is quite high. There is also a great difficulty in problem analysis. In some embodiments, audio and video data transmission include data transmission in a continuous manner (e.g., media streaming, video conference, etc.)

Based on the above, an RTMP-based solution is disclosed for audio and video data transmission. In the solution, expensive BGP bandwidth is replaced with cheaper edge bandwidth, and the original private UDP is replaced with a standard RTMP, so as to reduce the difficulty in client access and the costs. In an example, a schematic structural diagram of a video call in interactive live streaming in the related art shown in FIG. 1 is provided. In FIG. 1, a server end in a technical solution of a video call in interactive live streaming in the related art mainly includes the following modules: an audio and video encoding and decoding module (corresponding to an encoding and decoding server in FIG. 1), a stream control server, and a stream-pulling interface machine. Based on FIG. 1, a video call procedure in the related art includes the following steps:

Step S1: A terminal A and a terminal B in a video call respectively pull stream data from a stream-pulling interface machine, and the interface machine calculates round trip times (RTTs) and packet loss rates of clients (that is, the terminal A and the terminal B) during data transmission.

Step S2: The stream-pulling interface machine transmits the packet loss rates and the RTTs to a stream control server.

Step S3: The stream control server determines network quality data of the terminals according to the packet loss rates and the RTTs, configures encoding parameters (corresponding to stream control parameters in FIG. 1) respectively corresponding to the terminals, and delivers the encoding parameters to the stream-pulling interface machine.

Step S4: The stream-pulling interface machine obtains stream data (audio and/or video data) of a corresponding code rate and resolution from the encoding and decoding server according to the encoding parameters delivered by the stream control server, and delivers the obtained stream data to the clients.

Through the foregoing steps S1 to S4, in the related art, the stream-pulling interface machine monitors network status of different terminals in real time, and transparently transmits monitoring results to the stream control server. The stream control server calculates data delivery strategies in different scenarios according to a preset stream control algorithm and returns the data delivery strategies to the stream-pulling interface machine. The stream-pulling interface machine obtains corresponding audio and video data from the encoding and decoding server according to the delivery strategies (that is, encoding parameters) of different terminals, and delivers the audio and video data to the terminals. The solution provided by the related art mainly has the following problems: 1. An RTMP is implemented based on a transmission control protocol (TCP), and a large delay is caused due to a congestion control strategy inherent in TCP, thereby limiting use scenarios of the solution, and an entire end-to-end delay is longer than that of UDP; 2. Anti-network jitter performance is relatively poor, which causes data accumulation at a server end in a case of a poor network status. As a result, audio or a video outputted to a client is not smooth, and a freezing phenomenon occurs.

For the foregoing problems in the related art, no effective solution has been provided at present.

Based on the foregoing problems, the embodiments of this disclosure provide a data processing method and apparatus, a non-transitory computer-readable storage medium, and an electronic apparatus, to implement that audio data is delivered in real time and important video data is delivered secondarily or is temporarily not delivered in an audio and video data transmission scenario, for example, a video call scenario, so as to meet a requirement of a scenario that has a relatively low requirement for video data in some particular video call scenarios, for example, a video call scenario of insurance claim settlement, finance, or security, and in a case of a poor network status, remote interaction can still be implemented smoothly through a video call.

Figure 2A:
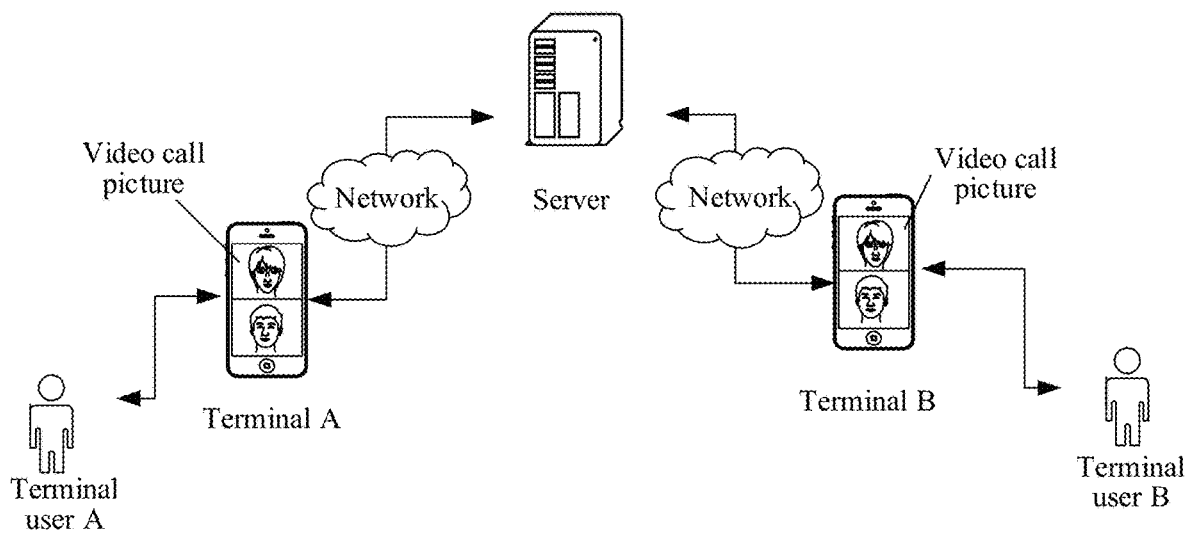
FIG. 2A is an exemplary schematic diagram of a video call in interactive live streaming according to an embodiment of this disclosure.

In an example, an embodiment of this disclosure provides a schematic diagram of a video call in interactive live streaming shown in FIG. 2A. In FIG. 2A, a user A may make, by using a terminal A, a video call with a user B who uses a terminal B. A server transmits, by using a network, audio and video data generated in a video call process to the terminal A and the terminal B, so that the terminal A and the terminal B display video call pictures (that is, video data) in respective graphical interfaces, and play audio corresponding to the video call pictures at the same time. In this embodiment of this disclosure, if it is detected that a delivery rate (a first rate) of the audio and video data is relatively low, for example, if it is detected that the delivery rate is less than a first predetermined threshold, the server may preferentially transmit audio data in the audio and video data to be transmitted to the terminal, and may temporarily skip transmitting video data or select video data of a type-specific frame (e.g., an I frame type, a B frame type, or a P frame type) and transmit the video data. For example, the server may decide to transmit video data belonging to I frame type only, or another type. In this way, in a case of a poor network status of the terminal, a smooth voice call can still be implemented, and network performance under jitter condition is improved.

Figure 2B:
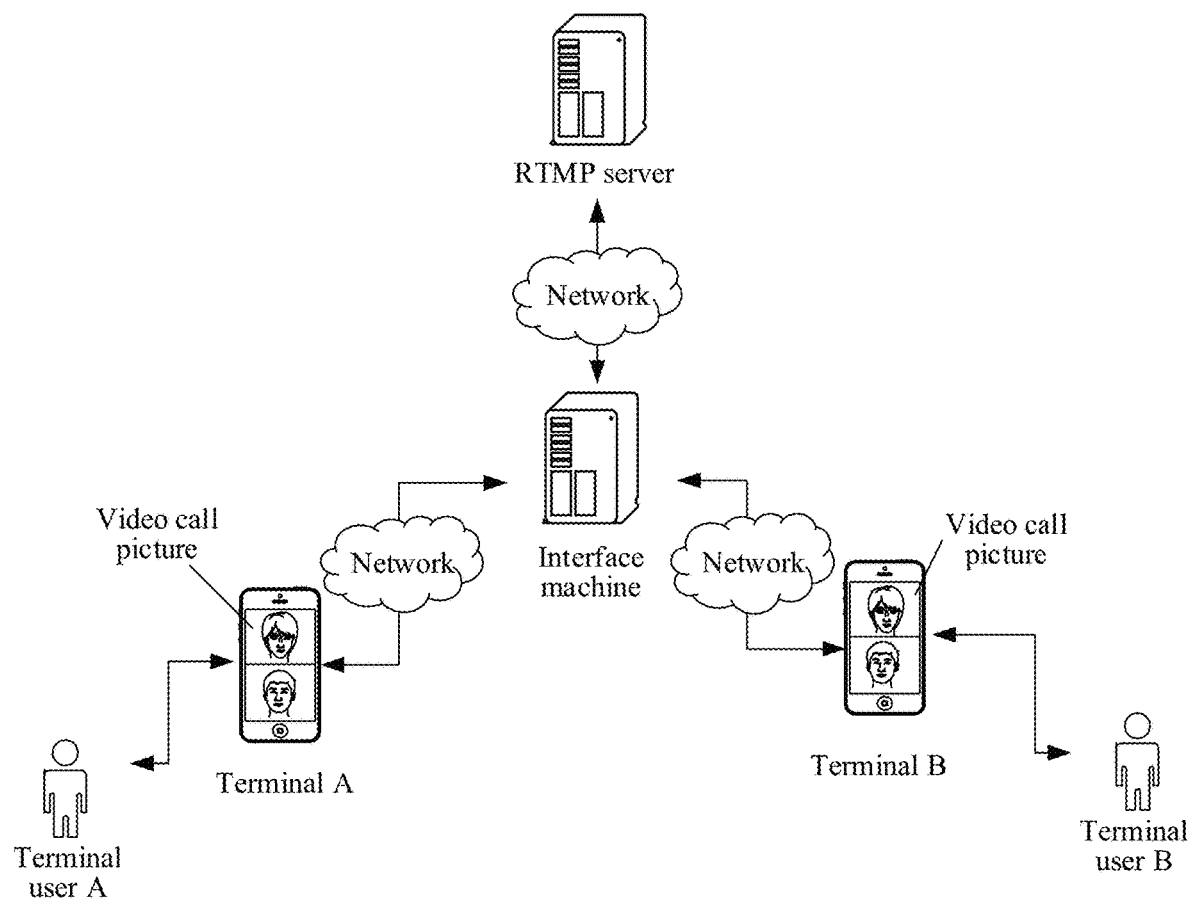
FIG. 2B is an exemplary schematic diagram of a video call in interactive live streaming according to an embodiment of this disclosure.

This embodiment of this disclosure further provides a schematic diagram of a video call in interactive live streaming shown in FIG. 2B. Based on FIG. 2A, an interface machine connected to a server by a network is added, and the server is an RTMP server. After the RTMP server transmits audio and video data to the interface machine, a terminal A and a terminal B display video call pictures in graphical interfaces of the terminals by pulling data in the interface machine, and play audio corresponding to the video call pictures at the same time. In this embodiment of this disclosure, the interface machine obtains a network status during data transmission with the terminal to monitor the terminal in real time. For example, the interface machine may monitor whether accumulation occurs in a transmit queue to obtain a network status of the terminal. If a lot of data accumulates, it indicates that the network status of the terminal is poor and there may be a congestion condition. The interface machine may further obtain at least one of bandwidth, an RTT, and a packet loss rate during the data transmission with the terminal to obtain the network status of the terminal. Certainly, monitoring manners are not limited thereto.

When it is detected through the network status that congestion occurs in the terminal, the interface machine transmits stream control signaling to the RTMP server. In response to and based on the stream control signaling, the RTMP server obtains, from the interface machine, a packet loss rate and an RTT of the audio and video data transmitted to the terminal, and calculates a first rate at which the audio and video data is transmitted. In a case that the first rate is less than a first predetermined threshold, the RTMP server transmits audio data to the interface machine, and discards video data in the same GOP as the audio data. In this way, it can be ensured that the terminal can smoothly receive and play the audio data, to ensure a video call effect. After the video data is discarded, the RTMP server obtains, in response to the stream control instruction transmitted by the interface machine, a second rate at which the audio data is transmitted to the interface machine. In a case that the second rate is greater than the first predetermined threshold and less than a second predetermined threshold, the RTMP server determines video data of a type-specific frame from the video data in the same GOP as the audio data, and simultaneously transmits the video data of the type-specific frame and the audio data to the interface machine. In a case that the second rate is greater than the second predetermined threshold, the RTMP server simultaneously transmits the audio data and the video data in the same GOP as the audio data to the interface machine, that is, restores the delivery of the audio and video data.

FIG. 2A and FIG. 2B merely show scenarios in which two terminals participate in a video call. However, in practice, more terminals may participate in a video call scenario. This embodiment of this disclosure may be applied to a scenario having a relatively high requirement for audio data, for example, a video call scenario of insurance claim settlement, finance, or security. In such a scenario, the focus is voices from participants of the video call, while video call pictures are less important. For example, when a user is involved with a traffic accident and makes a video call for insurance claim settlement, compared with pictures, it is more important for the user to tell the reason for the claim. When a user makes a video call to open an account, compared with pictures, it is more important for the user to utter information required for opening the account. When a user makes a video call for a securities transaction, compared with pictures, it is more important for the user to utter specific instructions about the transaction, for example, instructions for buying and selling securities. In this embodiment of this disclosure, audio data is preferentially transmitted in a weak network environment, thereby ensuring video call experience for terminal users and improving network data transmission performance in respective to a jitter condition.

In some embodiments, the servers shown in FIG. 2A and FIG. 2B may be independent physical servers, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. In addition, terminals shown in FIG. 2A and FIG. 2B may be smartphones, tablet computers, notebook computers, desktop computers, smart speakers, smartwatches, or the like, but are not limited thereto. The terminal and the interface machine as well as the interface machine and the server may be directly or indirectly connected in a wired or wireless communication manner. This is not limited in this embodiment of this disclosure.

Figure 3:
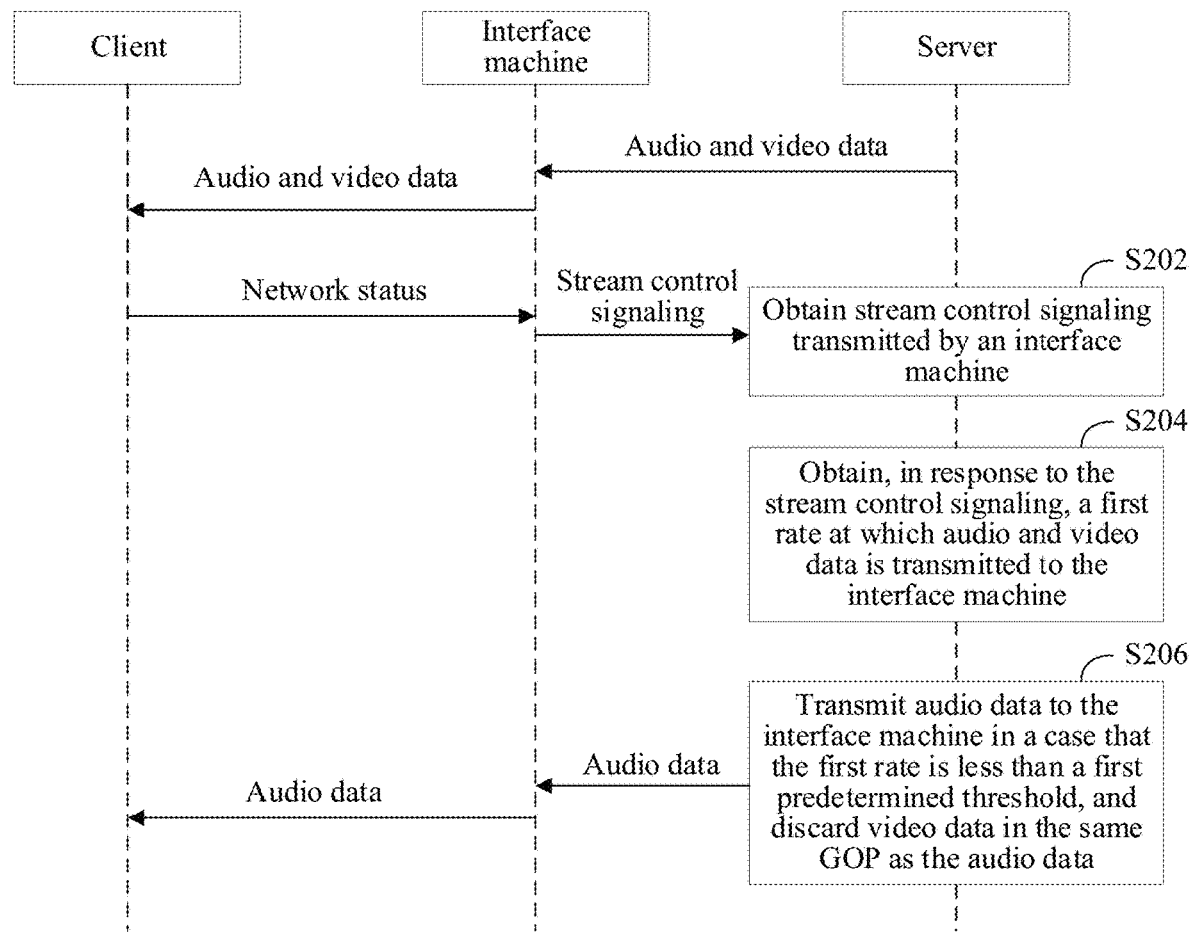
FIG. 3 is an exemplary flowchart of a data processing method according to an embodiment of this disclosure.

An embodiment of this disclosure provides a data processing method. FIG. 3 is an exemplary schematic flowchart of a data processing method. As shown in FIG. 3, the method includes the following steps:

Step S202: A server obtains stream control signaling transmitted by an interface machine, the interface machine being configured to obtain, from the server, audio and video data to be transmitted to a client.

The client in this embodiment of this disclosure may be a handheld apparatus (such as a mobile phone, a tablet, or a computer). In addition, the interface machine in this embodiment of this disclosure is used for obtaining data from the server and deliver the data to the client.

In some embodiments, step S202 may be implemented in the following manner:

Step S202-11: The interface machine obtains a network status during data transmission with the client.

Step S202-12: The interface machine transmits stream control signaling to the server if the network status indicates that congestion occurs in the client.

If the foregoing step S202 is applied in a video call scenario, the client may be one of video call clients, or a plurality of video call clients in the video call clients. For example, there are four video call clients currently, and the interface machine monitors network status of the four clients. As long as the network status of one of the four clients indicates congestion, the interface machine transmits the stream control signaling to the server, that is, makes preparation for the following stream control of audio data and video data. The network status may be obtained by determining, by using the interface machine, whether accumulation occurs in the audio and video data transmitted to the client. If a lot of audio and video data accumulates, it is determined that the network status of the client indicates that congestion occurs in the client. The network status may be alternatively calculated by obtaining, by using the interface machine, at least one of an RTT, bandwidth, and a packet loss rate during the data transmission with the client.

For example, a user having a client A is involved in an accident during driving, and a car of the user is scratched. Therefore, the user makes a video call by using the client A with an agent in an insurance company who uses a client B. During the video call for a claim settlement confirmation, a network status of the client A is poor due to a remote location of the user using the client A. In this case, an interface machine for delivering audio and video data to the client A and the client B transmits stream control signaling to a server if a poor network status of the client A is detected. Certainly, if the network status of the client B of the agent is poor, the interface machine also transmits stream control signaling to the server. That is, when the interface machine transmits stream control signaling, it indicates that the network status of the client currently is not at a normal level. However, to determine whether stream control needs to be performed, a packet loss rate and an RTT during data transmission with the client need to be further determined to determine a first rate, which is described in the following step S204.

This embodiment of this disclosure may be alternatively applied to an application scenario in which more than two terminals participate in a video call. The foregoing car insurance claim settlement is still used as an example. The user makes a video call by using the client A with the agent who uses the client B. After the agent learns about the details, for a procedure in which handling of some problems is not clear, or for some problems that the agent is not authorized to handle, the agent needs to report to a superior, and a client C of the superior of the agent is added to the video call scenario. In the video call scenario of the three terminals (clients), the interface machine monitors network status of the three clients to determine whether to transmit stream control signaling to the server.

Step S204: The server obtains, in response to the stream control signaling, a first rate at which the audio and video data is transmitted to the interface machine.

In some embodiments, the first rate may be determined according to a packet loss rate and an RTT of the client. For example, the server obtains, from the interface machine in response to the stream control signaling, a packet loss rate and an RTT of the data transmitted to the client, and determines, according to the packet loss rate and the RTT, the first rate at which the audio and video data is transmitted to the interface machine. In the video call scenario, packet loss rates and RTTs of a plurality of clients in a video call may all be calculated to obtain a first rate corresponding to each of the clients.

Step S206: The server transmits audio data to the interface machine if the first rate is less than a first predetermined threshold, and discards video data in the same GOP as the audio data.

The video data in the same GOP as the audio data is video data having playing time synchronous with playing time of the audio data. It is to be understood that, discarding video data may be a repetitive process. For example, if the network condition stays in a less optimal condition (e.g., under congestion condition), then video data from a live streaming session may be continuously discarded as new video/audio data presents.

In some embodiments, step S206 may be implemented by step S206-11 to step S206-13.

Step S206-11: The server splits the audio data and the video data from the audio and video data, the split audio data being placed in an audio data queue, the split video data being placed in a video data queue.

Step S206-12: The server adjusts a transmission order of the audio data and the video data in the same GOP, the adjusted transmission order being used for indicating that the audio data in the same GOP is transmitted before the video data.

Step S206-13: The server transmits the audio data in the audio data queue to the interface machine in the adjusted transmission order, and discards the video data that is in the video data queue and is in the same GOP as the audio data.

Through the foregoing steps S206-11 to S206-13, if the first rate is less than the first predetermined threshold, that is, if stream control needs to be performed on delivered data, the audio and video data is split, so that the audio data can be preferentially transmitted subsequently, thereby preferentially ensuring transmission of the audio data in a case of a poor network status of the client.

In the foregoing specific application scenario of the car insurance claim settlement, the foregoing steps S206-11 to step S206-13 may be implemented as follows. The interface machine detects a network status of the client A, splits the audio and video data in data transmission between the client A and the client B if it is calculated that a first rate corresponding to the client A is less than the first predetermined threshold, places split audio data and video data in corresponding queues respectively, and adjusts a transmission order of audio data and video data in the same GOP. That is, in the car insurance claim settlement, in a case of a quite poor network status, a result of the video call between the user and the agent by using the client A and the client B is that the user and the agent make a voice call without video data (that is, without video call pictures). The voice call can also basically meet a requirement for operations in the entire car insurance claim settlement, and does not affect remote interaction of the user. In this case, if the audio and video data is not split and the stream control is not performed, frozen screen, frame dropping, and the like may occur in the video call. As a result, a requirement for the video data cannot be satisfied, and even the audio data cannot be ensured, affecting the video call experience of the user.

Figure 4A:
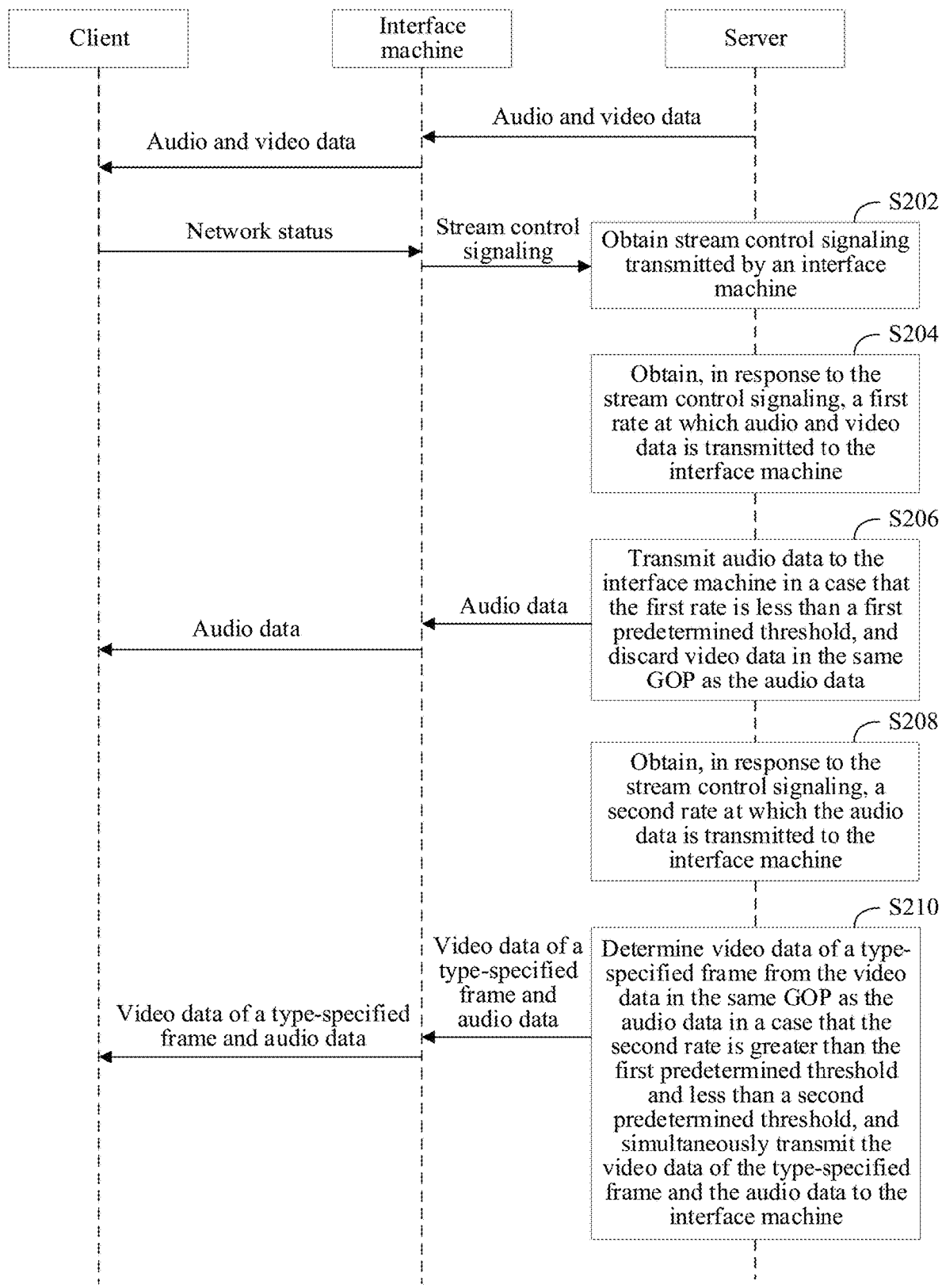
FIG. 4A is an exemplary flowchart of a data processing method according to an embodiment of this disclosure.

In this embodiment of this disclosure, after the server transmits the audio data to the interface machine and discards the video data in the same GOP as the audio data, the network status of the client may be gradually restored. For this case, the embodiment of this disclosure provides exemplary schematic flowcharts of the data processing method shown in FIG. 4A and FIG. 4B. In addition to the method steps in FIG. 3, method steps shown in FIG. 4A may further include the following method steps:

Step S208: The server obtains, in response to and based on the stream control signaling, a second rate at which the audio data is transmitted to the interface machine.

Step S210: The server determines video data of a type-specific frame from the video data in the same GOP as the audio data if the second rate is greater than the first predetermined threshold and less than a second predetermined threshold, and simultaneously transmits the video data of the type-specific frame and the audio data to the interface machine.

It can be learned from the foregoing steps S208 to S210 that if the network status of the client is gradually restored, that is, the second rate is greater than the first predetermined threshold and less than the second predetermined threshold, the server selects the video data of the type-specific frame from the video data in the same GOP as the audio data while preferentially transmitting the audio data, and simultaneously transmits the audio data and the video data of the type-specific frame. The type-specific frame may be I frame data in the video data, so that a basic video call can be implemented.

In step S206, if the server splits the audio and video data into audio data and video data, and places the audio data and the video data in corresponding queues respectively, step S210 may be includes: The server determines, from the video data queue if the second rate is greater than the first predetermined threshold and less than a second predetermined threshold, video data that is in the audio data queue and is in the same GOP as the audio data, determines video data of a type-specific frame from the video data in the same GOP, and simultaneously transmits the video data of the type-specific frame and the audio data in the audio data queue to the interface machine.

Figure 4B:
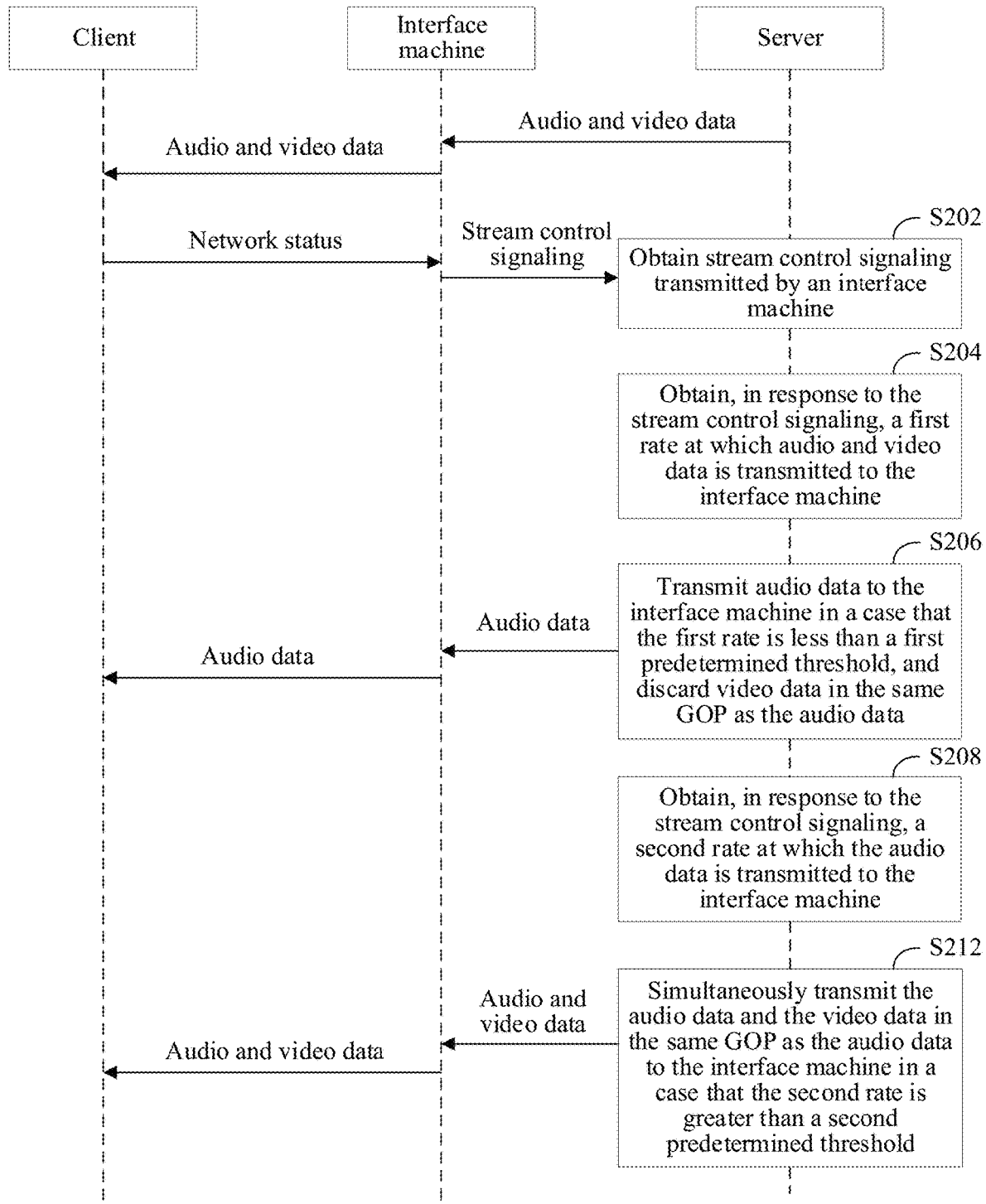
FIG. 4B is an exemplary flowchart of a data processing method according to an embodiment of this disclosure.

In addition to the method steps in FIG. 3, method steps shown in FIG. 4B may further include the following method steps:

Step S208: The server obtains, in response to the stream control signaling, a second rate at which the audio data is transmitted to the interface machine.

Step S212: The server simultaneously transmits the audio data, and the video data in the same GOP as the audio data, to the interface machine if the second rate is greater than a second predetermined threshold, the second predetermined threshold being greater than the first predetermined threshold.

It can be learned from the foregoing step S208 and step S212 that if the network status of the client is gradually restored, that is, the second rate is greater than the second predetermined threshold, the server simultaneously transmits the audio data and the video data in the same GOP as the audio data to the interface machine, that is, restores the delivery of the audio and video data.

In step S206, if the server splits the audio and video data into audio data and video data, and places the audio data and the video data in corresponding queues respectively, step S212 may be updated as follows: The server combines the audio data queue and the video data queue if the second rate is greater than a second predetermined threshold, to obtain audio and video data, and transmits the combined audio and video data to the interface machine, the second predetermined threshold being greater than the first predetermined threshold.

Descriptions are made by using the scenario of the car insurance claim settlement as an example. After the user makes the video call by using the client A with the agent who uses the client B, traffic jam occurs because many cars are involved in a traffic accident and car owners and passengers in the vehicles stuck in the traffic jam are all using mobile phones or other communication apparatuses, resulting in that the network status of the client A cannot reach a normal level. Based on the foregoing steps S202 to S206 in this embodiment of this disclosure, a video call is made between the client A and the client B. After a period of time, as traffic police handle the accident, the traffic jam is gradually relieved, and the network status of the client A is gradually restored. In this case, a basic video call is made between the client A and the client B according to step S210. After the traffic jam is completely resolved, the network status of the client A is restored to a normal level. In this case, a normal video call is implemented between the client A and the client B.

Figure 5:
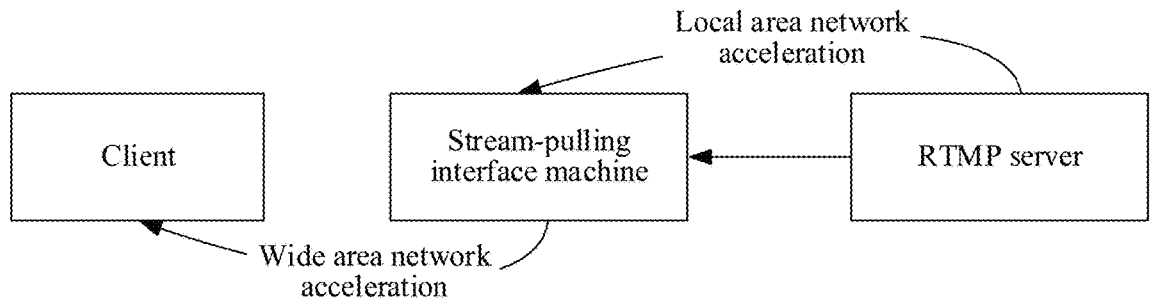
FIG. 5 is an exemplary schematic structural diagram of an RTMP-based video call according to an embodiment of this disclosure.

FIG. 5 is a schematic structural diagram of an RTMP-based video call according to an embodiment of this disclosure. As shown in FIG. 5, the structure of the video call includes a client, an interface machine (a stream-pulling interface machine), and a server (the server described in this embodiment of this disclosure may be an RTMP server). The stream-pulling interface machine is capable of monitoring a packet loss rate and an RTT of the client in real time. The client is configured to pull data of the RTMP server from the interface machine. The RTMP server is configured to calculate stream control data, formulate a stream control strategy, and deliver stream data.

Figure 6:
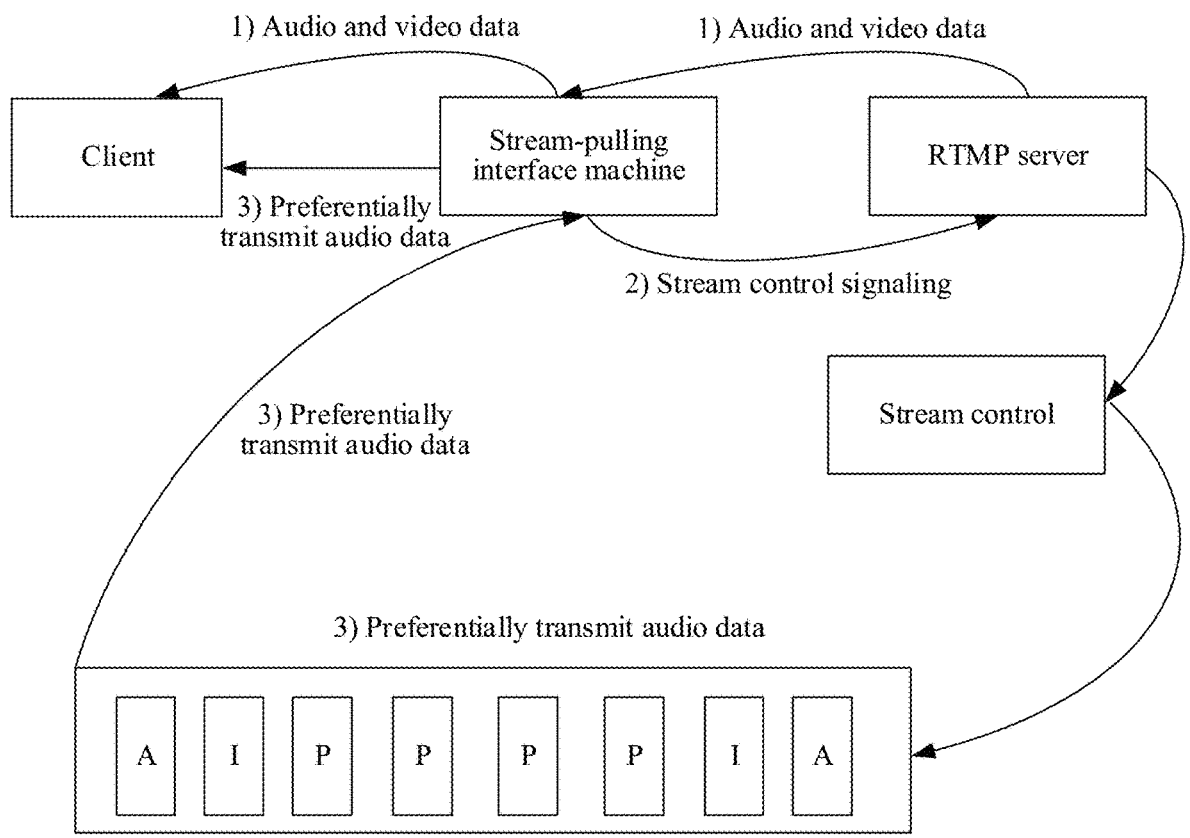
FIG. 6 is an exemplary schematic diagram of a stream-control process of an RTMP-based video call according to an embodiment of this disclosure.

FIG. 6 is a schematic diagram of a stream-control process of an RTMP-based video call according to an embodiment of this disclosure. Based on FIG. 6, the stream control method includes the following steps:

Step S502: A client pulls a stream from a stream-pulling interface machine according to a video call stream-pulling address.

As shown by the numeral 1) in FIG. 6, an RTMP server transmits audio and video data to the stream-pulling interface machine, and the client accesses the stream-pulling interface machine according to the video call stream-pulling address, to obtain the audio and video data from the stream-pulling interface machine. FIG. 6 merely shows one terminal (client). There may be one or more other terminals in the video call.

Step S504: The stream-pulling interface machine attempts, according to a network condition of the client, to calculate network quality data in the process in which the client obtains the audio and video data from the interface machine, determines whether to adopt a stream control strategy, and transmits stream control signaling to the RTMP server if it is determined to adopt the stream control strategy.

As shown by the numeral 2) in FIG. 6, the stream-pulling interface machine obtains network quality data of the client during data transmission with the client, that is, monitors a network status of the client. If the network status indicates that congestion occurs in the client, the stream-pulling interface machine adopts the stream control strategy, and transmits the stream control signaling to the RTMP server.

Step S506: After receiving the stream control signaling, the RTMP server calculates a data delivery rate of the current client, and splits an original audio and video queue into two queues according to a preset algorithm, audio data in the same GOP being delivered preferentially.

As shown by the numeral 3) in FIG. 6, the RTMP server performs stream control, and the audio data in the same GOP is delivered preferentially. "A" in FIG. 6 represents audio data, I represents an I frame in video data, and P represents a P frame in the video data. Herein, in this step, the calculated data delivery rate corresponds to the foregoing first rate.

Step S508: Discard video data in the GOP if the RTMP server continuously receives the stream control signaling transmitted by the stream-pulling interface machine and the calculated data delivery rate is less than a particular threshold, to ensure the delivery continuity of current and subsequent audio.

Herein, if the first rate is less than a first predetermined threshold, for a to-be-transmitted GOP, the RTMP server discards video data in the GOP to ensure that audio data in the GOP can be smoothly transmitted to the client by using the stream-pulling interface machine.

Step S510: The stream-pulling interface machine transmits a corresponding network parameter to the RTMP server if the stream-pulling interface machine detects an optimization of the network status of the client, and after perceiving the optimization of the network status, the RTMP server restores delivery of some video data according to the preset algorithm, delivery of I frame data being preferentially selected and restored, to ensure basic video continuity.

For example, after step S508, the stream-pulling interface machine transmits the packet loss rate and the RTT of the client to the RTMP server, and the RTMP server calculates, according to the packet loss rate and the RTT, a second rate at which the audio data is transmitted. If the second rate is greater than the first predetermined threshold and less than a second predetermined threshold, for a to-be-transmitted GOP, the RTMP server selects video data of a type-specific frame from the GOP and transmits audio data and the video data of the type-specific frame in the GOP to the client by using the stream-pulling interface machine. Because the I frame is a key frame in the GOP and has relatively high significance, the type-specific frame may be an I frame.

Step S512: The RTMP server combines transmit queues of the audio data and the video data if the network status is restored to a normal level, and delivers all uplink data.

For example, if the second rate calculated by the RTMP server is greater than the second predetermined threshold, the RTMP server combines the audio data queue and the video data queue to obtain audio and video data, and transmits the audio and video data to the client by using the stream-pulling interface machine, that is, restores the delivery of the audio and video data.

The foregoing steps S502 to S512 may be implemented based on RTMP user control signaling without any special customization requirement of a client. In addition, all stream control operations are completed at a server end, and the client has no perception. Therefore, an ordinary RTMP player can make a video call, pull a stream, and play audio and a video without customization. Next, based on real-time monitoring of a network status and adjustment of a delivery strategy of audio and video data, a stream control algorithm meets the expectation of real-time audio delivery under an expected weak network condition, can also ensure the capability of quick restoration, and also has adequate performance in a test environment and scenarios of actual business.

For ease of description, the foregoing method embodiments are stated as a series of action combinations. However, a person skilled in the art is to learn that this application is not limited to the described sequence of the actions because according to this application, some steps may use another sequence or may be simultaneously performed. Next, a person skilled in the art is to learn that the embodiments described in this disclosure all belong to exemplary embodiments and the actions and modules described herein are not necessary for this application.

Figure 7:
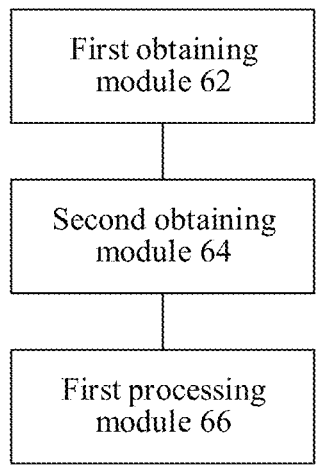
FIG. 7 is an exemplary schematic structural diagram of a data processing apparatus according to an embodiment of this disclosure.

An embodiment of this disclosure further provides a data processing apparatus configured to implement the data processing method. FIG. 7 is a schematic structural diagram of a data processing apparatus according to an embodiment of this disclosure. As shown in FIG. 7, the apparatus includes: a first obtaining module 62, configured to obtain stream control signaling transmitted by an interface machine, the interface machine being configured to obtain, from the server, audio and video data to be transmitted to a client; a second obtaining module 64, coupled to the first obtaining module 62, and configured to obtain, in response to the stream control signaling, a first rate at which the server transmits the audio and video data to the interface machine; and a first processing module 66, coupled to the second obtaining module 64, and configured to: transmit audio data to the interface machine if the first rate is less than a first predetermined threshold, and discard video data in the same GOP as the audio data.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In some embodiments, the first obtaining module 62 is configured to obtain a stream control instruction transmitted by the interface machine if congestion is detected in the client. The interface machine is configured to: obtain a network status during data transmission with the client, and monitor, according to the network status, whether congestion occurs in the client.

In some embodiments, the second obtaining module 64 is configured to: obtain, in response to the stream control signaling, a packet loss rate and an RTT of the audio and video data that is transmitted by the interface machine to the client, and determine, according to the packet loss rate and the RTT, the first rate at which the server transmits the audio and video data to the interface machine.

Figure 8:
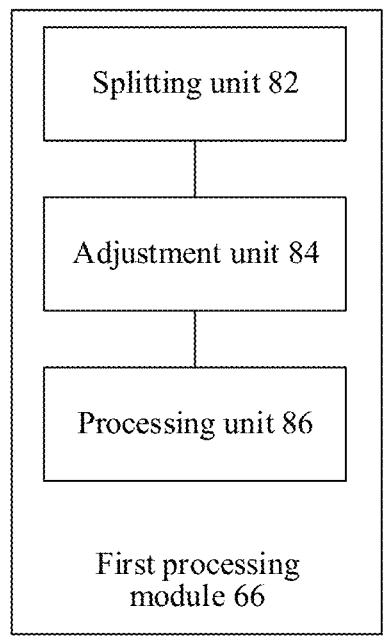
FIG. 8 is an exemplary schematic structural diagram of a data processing apparatus according to an embodiment of this disclosure.

FIG. 8 is an exemplary schematic structural diagram of the data processing apparatus according to this embodiment of this disclosure. As shown in FIG. 8, the first processing module 66 in this embodiment of this disclosure includes: a splitting unit 82, configured to split the audio data and the video data from the audio and video data, the split audio data being placed in an audio data queue, the split video data being placed in a video data queue; an adjustment unit 84, coupled to the splitting unit 82, and configured to adjust a transmission order of the audio data and the video data in the same GOP, the adjusted transmission order being used for indicating that the audio data in the same GOP is transmitted before the video data; and a processing unit 86, coupled to the adjustment unit 84, and configured to: transmit the audio data in the audio data queue to the interface machine in the adjusted transmission order, and discard the video data that is in the video data queue and is in the same GOP as the audio data.

In some embodiments, the data processing apparatus further includes: a third obtaining module, configured to obtain, in response to the stream control signaling, a second rate at which the server transmits the audio data to the interface machine; and a second processing module, configured to determine, from the video data queue if the second rate is greater than the first predetermined threshold and less than a second predetermined threshold, the video data that is in the audio data queue and is in the same GOP as the audio data, and determine video data of a type-specific frame from the video data in the same GOP; and simultaneously transmit the video data of the type-specific frame and the audio data in the audio data queue to the interface machine.

In some embodiments, the third obtaining module is configured to obtain, in response to the stream control signaling, a second rate at which the server transmits the audio data to the interface machine; and the third processing module is configured to: combine the audio data queue and the video data queue if the second rate is greater than a second predetermined threshold, to obtain audio and video data, and transmit the combined audio and video data to the interface machine. The second predetermined threshold is greater than the first predetermined threshold.

Figure 9:
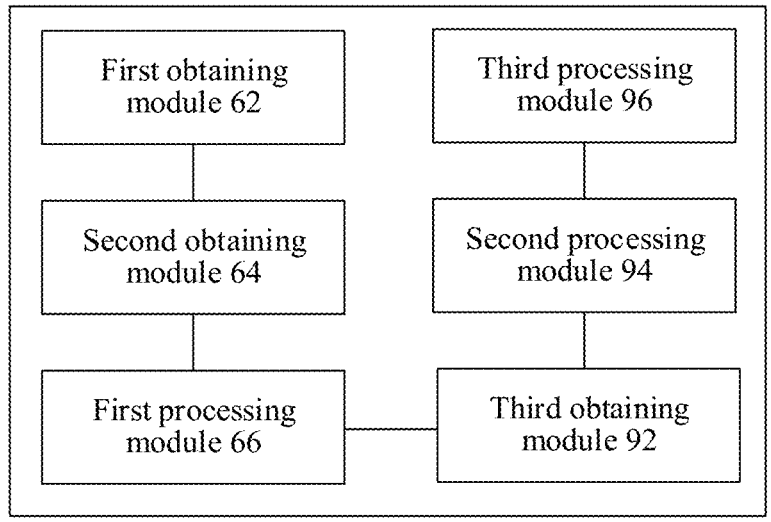
FIG. 9 is an exemplary schematic structural diagram of a data processing apparatus according to an embodiment of this disclosure.

FIG. 9 is an exemplary schematic structural diagram of the data processing apparatus according to this embodiment of this disclosure. As shown in FIG. 9, the apparatus in this embodiment of this disclosure may further include: a third obtaining module 92, coupled to the first processing module 66, and configured to obtain, in response to the stream control signaling after the audio data is transmitted to the interface machine and the video data in the same GOP as the audio data is discarded, the second rate at which the server transmits the audio data to the interface machine; a second processing module 94, coupled to the third obtaining module 92, and configured to: determine video data of a type-specific frame from the video data in the same GOP as the audio data if the second rate is greater than the first predetermined threshold and less than a second predetermined threshold, and simultaneously transmit the video data of the type-specific frame and the audio data to the interface machine; and a third processing module 96, coupled to the second processing module 94, and configured to simultaneously transmit the audio data and the video data in the same GOP as the audio data to the interface machine if the second rate is greater than the second predetermined threshold.

Figure 10:
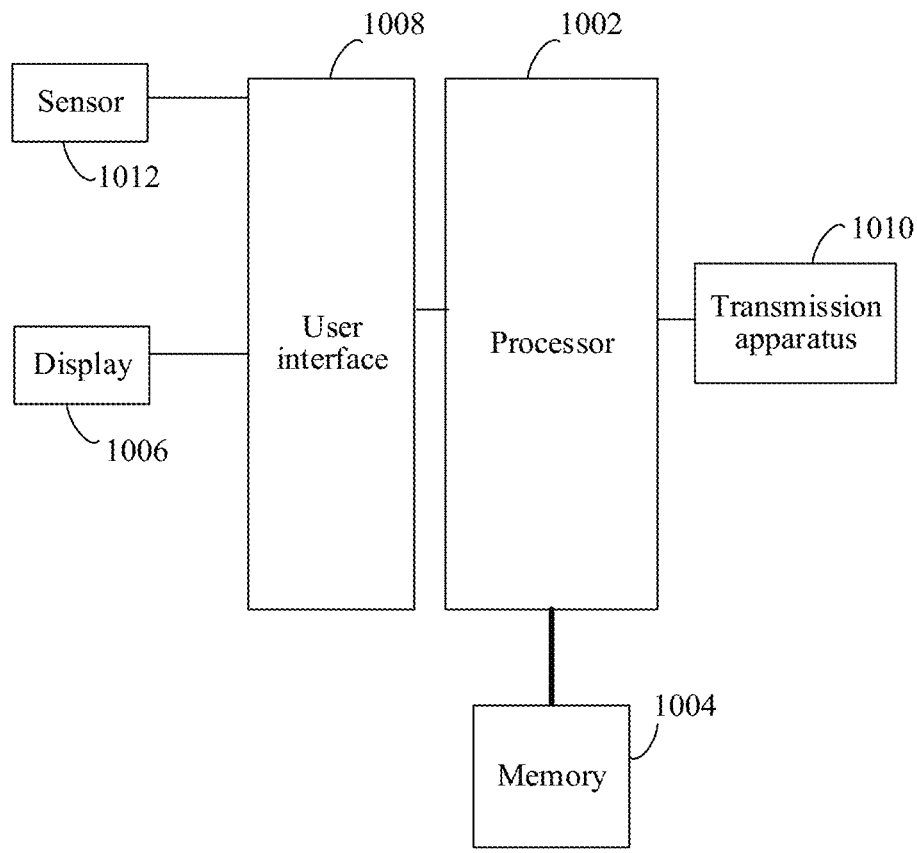
FIG. 10 is a schematic structural diagram of an exemplary electronic apparatus according to an embodiment of this disclosure.

An embodiment of this disclosure further provides an electronic apparatus configured to implement the foregoing data processing method. As shown in FIG. 10, the electronic apparatus includes: a processor 1002, a memory 1004, a display 1006, a user interface 1008, a transmission apparatus 1010, a sensor 1012, and the like. The memory stores a computer program, and the processor is configured to, when executing the computer program, implement the data processing method provided by the embodiments of this disclosure.

In some embodiments, the electronic apparatus may be located in at least one of a plurality of network devices in a computer network.

A person of ordinary skill in the art can understand that the structure shown in FIG. 10 is merely exemplary, and the electronic apparatus may be an independent physical server, or may be a server constructed by using a virtualization technology. FIG. 10 does not constitute a limitation on the structure of the electronic apparatus. For example, the electronic apparatus may further include more or fewer components (such as a network interface) than those shown in FIG. 10, or have a configuration different from that shown in FIG. 10.

The memory 1004 may be configured to store a software program and module, for example, a program instruction/module corresponding to the data processing method and apparatus in the embodiments of this disclosure. The processor 1002 runs the software program and module stored in the memory 1004, to implement various functional applications and data processing, that is, implement the foregoing data processing method. The memory 1004 may include a high-speed random memory, and may also include a non-volatile memory, for example, one or more magnetic storage apparatuses, a flash memory, or another non-volatile solid-state memory. In some embodiments, the memory 1004 may further include memories remotely disposed relative to the processor 1002, and the remote memories may be connected to a terminal by using a network. Examples of the network include, but are not limited to, the Internet, an intranet, a local area network, a mobile communications network, and a combination thereof.

The transmission apparatus 1010 is configured to receive or transmit data by using a network. Specific examples of the foregoing network may include a wired network and a wireless network. In some embodiments, the transmission apparatus 1010 includes a network interface controller (NIC). The NIC may be connected to another network device and a router by using a network cable, so as to communicate with the Internet or a local area network. In some embodiments, the transmission apparatus 1010 is a radio frequency (RF) module, which communicates with the Internet in a wireless manner.

The sensor 1012 is configured to acquire data. The display 1006 displays the network status, and the user interface 1008 is configured to acquire an inputted operation instruction.

The embodiments of this disclosure provide a data processing solution. After the interface machine transmits the stream control signaling, a network rate of a current terminal is detected, to further determine the first rate at which the server transmits the audio and video data to the interface machine. In a case that the first rate is less than the first predetermined threshold, the server transmits the audio data to the interface machine, and discards the video data in the same GOP as the audio data, to implement that the audio data is preferentially delivered and the video data is temporarily not transmitted, and further resolve a technical problem of unsmooth audio transmission caused by relatively poor anti-network jitter performance in an RTMP-based video call solution in the related art.

An embodiment of this disclosure further provides a non-transitory computer-readable storage medium. The non-transitory computer-readable storage medium stores a computer program, the computer program, when executed, implementing the data processing method provided by the embodiments of this disclosure, for example, the data processing method shown in any one of the accompanying drawings shown in FIG. 3, FIG. 4A, and FIG. 4B.

In some embodiments, the non-transitory computer-readable storage medium is further configured to store a computer program configured to perform the steps included in the data processing method provided in the embodiments of this disclosure. This is not described again in this embodiment of this disclosure.

In this embodiment of this disclosure, a person of ordinary skill in the art may understand that all or some of the steps of the methods in the foregoing embodiments may be implemented by a program instructing relevant hardware of the device. The computer program may be stored in a non-transitory computer-readable storage medium, and the non-transitory computer-readable storage medium may be a flash disk, a read-only memory (ROM), a programmable read-only memory (PROM), an erasable programmable read-only memory (EPROM), an electrically erasable programmable read-only memory (EEPROM), a CD-ROM, a random access memory (RAM), a ferroelectric RAM (FRAM), a magnetic disk, an optical disc, or the like.

In some embodiments, the computer program may be written in any form of programming language (including a compiled or interpreted language, or a declarative or procedural language), and the computer program may be deployed in any form, including being deployed as an independent program or being deployed as a module, a component, a subroutine, or another unit suitable for use in a computing environment.

In an example, the computer program may be deployed to be executed on a computing device, or deployed to be executed on a plurality of computing devices at the same location, or deployed to be executed on a plurality of computing devices that are distributed in a plurality of locations and interconnected by using a communication network.

The sequence numbers in the foregoing embodiments of this disclosure are merely for description purpose, and are not intended to indicate priorities of the embodiments.

When the integrated unit in the foregoing embodiments is implemented in a form of a software functional unit and sold or used as an independent product, the integrated unit may be stored in the foregoing non-transitory computer-readable storage medium. Based on such an understanding, the embodiments of this disclosure essentially, or the part contributing to the related art, or all or some of the embodiments of this disclosure may be implemented in the form of a software product. The computer software product is stored in a non-transitory computer-readable storage medium and includes several instructions for instructing one or more computer devices (which may be a personal computer, a server, a network device, or the like) to perform all or some of the steps of the data processing method provided in the embodiments of this disclosure.

In the embodiments of this disclosure, the descriptions of the embodiments have respective focuses. For a part that is not described in detail in an embodiment, reference may be made to related descriptions in other embodiments.

In the several embodiments provided in this application, it is to be understood that the disclosed device may be implemented in other manners. The foregoing described apparatus embodiments are merely examples. For example, the unit division is merely logical function division and there may be other division manners in other implementations. For example, a plurality of units or components may be combined or integrated into another system, or some features may be omitted or not performed. In addition, the coupling, or direct coupling, or communication connection between the displayed or discussed components may be the indirect coupling or communication connection by means of some interfaces, units, or modules, and may be electrical or of other forms.

The units described as separate components may or may not be physically separate, and components displayed as units may or may not be physical units, may be located in one position, or may be distributed on a plurality of network units. Some or all of the units may be selected according to actual needs to achieve the objectives of the solutions of the embodiments of this disclosure.

In addition, functional units in the embodiments of this disclosure may be integrated into one processing unit, or each of the units may be physically separated, or two or more units may be integrated into one unit. The integrated unit may be implemented in the form of hardware, or may be implemented in a form of a software functional unit.

Based on the above, the following technical effects can be achieved through the embodiments of this disclosure:
1) Data stream control is performed according to a network status of a client. In a case of a poor network status of the client, the transmission of audio data is preferentially ensured. In a case that the network status of the client is gradually restored, the transmission of video data is gradually restored. In this way, the experience of a client user is ensured, and the anti-network jitter performance during data transmission is further improved. Therefore, the embodiments of this disclosure are applicable to various application scenarios of audio and video data transmission, for example, a video call interaction scenario in a weak network environment.
2) The embodiments of this disclosure may be implemented based on RTMP user control signaling without any special customization requirement for a client. In addition, all stream control operations are completed at a server end, and the client has no perception. Therefore, an ordinary RTMP player can make a video call, pull a stream, and play audio and a video, and the implementation is less difficult.
3) Audio and video data is split. Split audio data and video data are placed in corresponding queues respectively, and operations are performed on the queues during stream control, thereby improving simplicity and accuracy of the stream control.

The foregoing descriptions are merely exemplary implementations of this application. A person of ordinary skill in the art may further make several improvements and modifications without departing from the principle of this application, and the improvements and modifications fall within the protection scope of this application.

INDUSTRIAL PRACTICABILITY

In the embodiments of this disclosure, if stream control signaling transmitted by an interface machine is obtained, a first rate at which a server transmits audio and video data to the interface machine is obtained. If the first rate is less than a first predetermined threshold, audio data is transmitted to the interface machine, and video data in the same GOP as the audio data is discarded. In this way, the audio data is preferentially transmitted, thereby improving the anti-network jitter performance during data transmission, and the embodiments of this disclosure are suitable for a weak network environment.

What is claimed is:

1. A method for video and audio data processing, performed by a server, the method comprising:
   obtaining stream control signaling transmitted by an interface machine, the interface machine being configured to obtain, from the server, audio and video data to be transmitted to a client;
   obtaining, in response to the stream control signaling, a first transmission rate from the server to the interface machine;
   splitting audio data and video data from the audio and video data, the split audio data being laced in an audio data queue, the split video data being placed in a video data queue;
   adjusting a transmission order of the audio data and the video data in the same GOP, the adjusted transmission order indicating that the audio data in the same GOP is transmitted before the video data; and
   transmitting the audio data in the audio data queue to the interface machine based on the adjusted transmission order, and discarding the video data that is in the video data queue and is in the same GOP as the audio data.

2. The method according to claim 1, wherein after discarding the video data that is in the video data queue and is in the same GOP as the audio data, the method further comprises:
   obtaining, in response to the stream control signaling, a second transmission rate from the server to the interface machine;
   determining, from the video data queue in response to the second rate being greater than a first predetermined threshold and less than a second predetermined threshold, first video data that is in the video data queue and is in the same GOP as first audio data in the audio data queue, and
   determining second video data of a type-specific frame from the first video data; and
   simultaneously transmitting the second video data and the first audio data to the interface machine.

3. The method according to claim 1, wherein after discarding the video data that is in the video data queue and is in the same GOP as the audio data, the method further comprises:
   obtaining, in response to the stream control signaling, a second transmission rate from the server to the interface machine;
   combining the audio data queue and the video data queue in response to the second rate being greater than a second predetermined threshold, to obtain second audio and video data; and
   transmitting the second audio and video data to the interface machine,
   the second predetermined threshold being greater than a first predetermined threshold.

4. The method according to claim 1, wherein obtaining, in response to the stream control signaling, the first transmission rate from the server to the interface machine comprises:
   obtaining, in response to the stream control signaling, a packet loss rate and a round trip time (RTT) of audio and video data that is transmitted by the interface machine to the client, and
   determining, according to the packet loss rate and the RTT, the first transmission rate from the server to the interface machine.

5. The method according to claim 1, wherein obtaining the stream control signaling transmitted by the interface machine comprises:
   obtaining the stream control signaling transmitted by the interface machine in response to congestion being detected in the client,
   wherein the interface machine is configured to: obtain a network status during data transmission with the client, and monitor, according to the network status, whether congestion occurs in the client.

6. The method according to claim 1, wherein after transmitting the audio data to the interface machine, and discarding the video data in the same GOP as the audio data, the method further comprises:
   obtaining, in response to the stream control signaling, a second transmission rate from the server to the interface machine; and
   determining first video data of a type-specific frame from second video data in the same GOP as first audio data in response to the second rate being greater than a first predetermined threshold and less than a second predetermined threshold, and
   simultaneously transmitting the first video data and the first audio data to the interface machine.

7. The method according to claim 1, wherein after transmitting the audio data to the interface machine, and discarding the video data in the same GOP as the audio data, the method further comprises:
   obtaining, in response to the stream control signaling, a second transmission rate from the server to the interface machine; and
   simultaneously transmitting first audio data and first video data in the same GOP as the first audio data to the interface machine in response to the second rate being greater than a second predetermined threshold,
   the second predetermined threshold being greater than a first predetermined threshold.

8. A device for data processing, comprising a memory for storing computer instructions and a processor in communication with the memory, wherein, when the processor executes the computer instructions, the processor is configured to cause the device to:
   obtain stream control signaling transmitted by an interface machine, the interface machine being configured to obtain, from the device, audio and video data to be transmitted to a client;
   obtain, in response to the stream control signaling, a first transmission rate from the device to the interface machine;
   split audio data and video data from the audio and video data, the split audio data being laced in an audio data queue, the split video data being placed in a video data queue;
   adjust a transmission order of the audio data and the video data in the same GOP, the adjusted transmission order indicating that the audio data in the same GOP is transmitted before the video data; and
   transmit the audio data in the audio data queue to the interface machine based on the adjusted transmission order, and discard the video data that is in the video data queue and is in the same GOP as the audio data.

9. The device according to claim 8, wherein, after the processor is configured to cause the device to discard the video data that is in the video data queue and is in the same GOP as the audio data, the processor is configured to further cause the device to:
    obtain, in response to the stream control signaling, a second transmission rate from the device to the interface machine;
    determine, from the video data queue in response to the second rate being greater than a first predetermined threshold and less than a second predetermined threshold, first video data that is in the video data queue and is in the same GOP as first audio data in the audio data queue, and
    determine second video data of a type-specific frame from the first video data; and
    simultaneously transmit the second video data and the first audio data to the interface machine.

10. The device according to claim 8, wherein, after the processor is configured to cause the device to discard the video data that is in the video data queue and is in the same GOP as the audio data, the processor is configured to further cause the device to:
    obtain, in response to the stream control signaling, a second transmission rate from the device to the interface machine;
    combine the audio data queue and the video data queue in response to the second rate being greater than a second predetermined threshold, to obtain second audio and video data; and
    transmit the second audio and video data to the interface machine, the second predetermined threshold being greater than a first predetermined threshold.

11. The device according to claim 8, wherein, when the processor is configured to cause the device to obtain, in response to the stream control signaling, the first transmission rate from the device to the interface machine, the processor is configured to cause the device to:
    obtain, in response to the stream control signaling, a packet loss rate and a round trip time (RTT) of audio and video data that is transmitted by the interface machine to the client, and
    determine, according to the packet loss rate and the RTT, the first transmission rate from the device to the interface machine.

12. The device according to claim 8, wherein, when the processor is configured to cause the device to obtain the stream control signaling transmitted by the interface machine, the processor is configured to cause the device to:
    obtain the stream control signaling transmitted by the interface machine in response to congestion being detected in the client,
    wherein the interface machine is configured to: obtain a network status during data transmission with the client, and monitor, according to the network status, whether congestion occurs in the client.

13. The device according to claim 8, wherein, after the processor is configured to cause the device to transmit the audio data to the interface machine, and discard the video data in the same GOP as the audio data, the processor is configured to further cause the device to:
    obtain, in response to the stream control signaling, a second transmission rate from the device to the interface machine; and
    determine first video data of a type-specific frame from second video data in the same GOP as first audio data in response to the second rate being greater than a first predetermined threshold and less than a second predetermined threshold, and simultaneously transmit the first video data and the first audio data to the interface machine.

14. The device according to claim 8, wherein, after the processor is configured to cause the device to transmit the audio data to the interface machine, and discard the video data in the same GOP as the audio data, the processor is configured to further cause the device to:
    obtain, in response to the stream control signaling, a second transmission rate from the device to the interface machine; and
    simultaneously transmit first audio data and first video data in the same GOP as the first audio data to the interface machine in response to the second rate being greater than a second predetermined threshold,
    the second predetermined threshold being greater than a first predetermined threshold.

15. A non-transitory storage medium for storing computer readable instructions, the computer readable instructions, when executed by a processor in a device, causing the processor to:
    obtain stream control signaling transmitted by an interface machine, the interface machine being configured to obtain, from the device, audio and video data to be transmitted to a client;
    obtain, in response to the stream control signaling, a first transmission rate from the device to the interface machine;
    split audio data and video data from the audio and video data, the split audio data being laced in an audio data queue, the split video data being placed in a video data queue;
    adjust a transmission order of the audio data and the video data in the same GOP, the adjusted transmission order indicating that the audio data in the same GOP is transmitted before the video data; and
    transmit the audio data in the audio data queue to the interface machine based on the adjusted transmission order, and discard the video data that is in the video data queue and is in the same GOP as the audio data.

16. The non-transitory storage medium according to claim 15, wherein, after the computer readable instructions cause the processor discard the video data that is in the video data queue and is in the same GOP as the audio data, the computer readable instructions further cause the processor to:
    obtain, in response to the stream control signaling, a second transmission rate from the device to the interface machine;
    determine, from the video data queue in response to the second rate being greater than a first predetermined threshold and less than a second predetermined threshold, first video data that is in the video data queue and is in the same GOP as first audio data in the audio data queue, and
    determine second video data of a type-specific frame from the first video data; and
    simultaneously transmit the second video data and the first audio data to the interface machine.

17. The non-transitory storage medium according to claim 15, wherein, after the computer readable instructions cause the processor to discard the video data that is in the video data queue and is in the same GOP as the audio data, the computer readable instructions further cause the processor to:
    obtain, in response to the stream control signaling, a second transmission rate from the device to the interface machine;

combine the audio data queue and the video data queue in response to the second rate being greater than a second predetermined threshold, to obtain second audio and video data; and transmit the second audio and video data to the interface machine, the second predetermined threshold being greater than a first predetermined threshold.

18. The device according to claim 15, wherein, when the computer readable instructions cause the processor to obtain, in response to the stream control signaling, the first transmission rate from the device to the interface machine, the computer readable instructions cause the processor to:

obtain, in response to the stream control signaling, a packet loss rate and a round trip time (RTT) of audio and video data that is transmitted by the interface machine to the client, and determine, according to the packet loss rate and the RTT, the first transmission rate from the device to the interface machine.

19. The device according to claim 15, wherein, when the computer readable instructions cause the processor to obtain the stream control signaling transmitted by the interface machine, the processor is configured to cause the device to:

obtain the stream control signaling transmitted by the interface machine in response to congestion being detected in the client, wherein the interface machine is configured to: obtain a network status during data transmission with the client, and monitor, according to the network status, whether congestion occurs in the client.

20. The device according to claim 15, wherein, after the computer readable instructions cause the processor to transmit the audio data to the interface machine, and discard the video data in the same GOP as the audio data, the computer readable instructions further cause the processor to:

obtain, in response to the stream control signaling, a second transmission rate from the device to the interface machine; and determine first video data of a type-specific frame from second video data in the same GOP as first audio data in response to the second rate being greater than a first predetermined threshold and less than a second predetermined threshold, and simultaneously transmit the first video data and the first audio data to the interface machine.

* * * * *